Nov. 5, 1929.   E. C. WELLS   1,734,888
ICE SAWING MACHINE
Filed Nov. 26, 1927   4 Sheets-Sheet 2
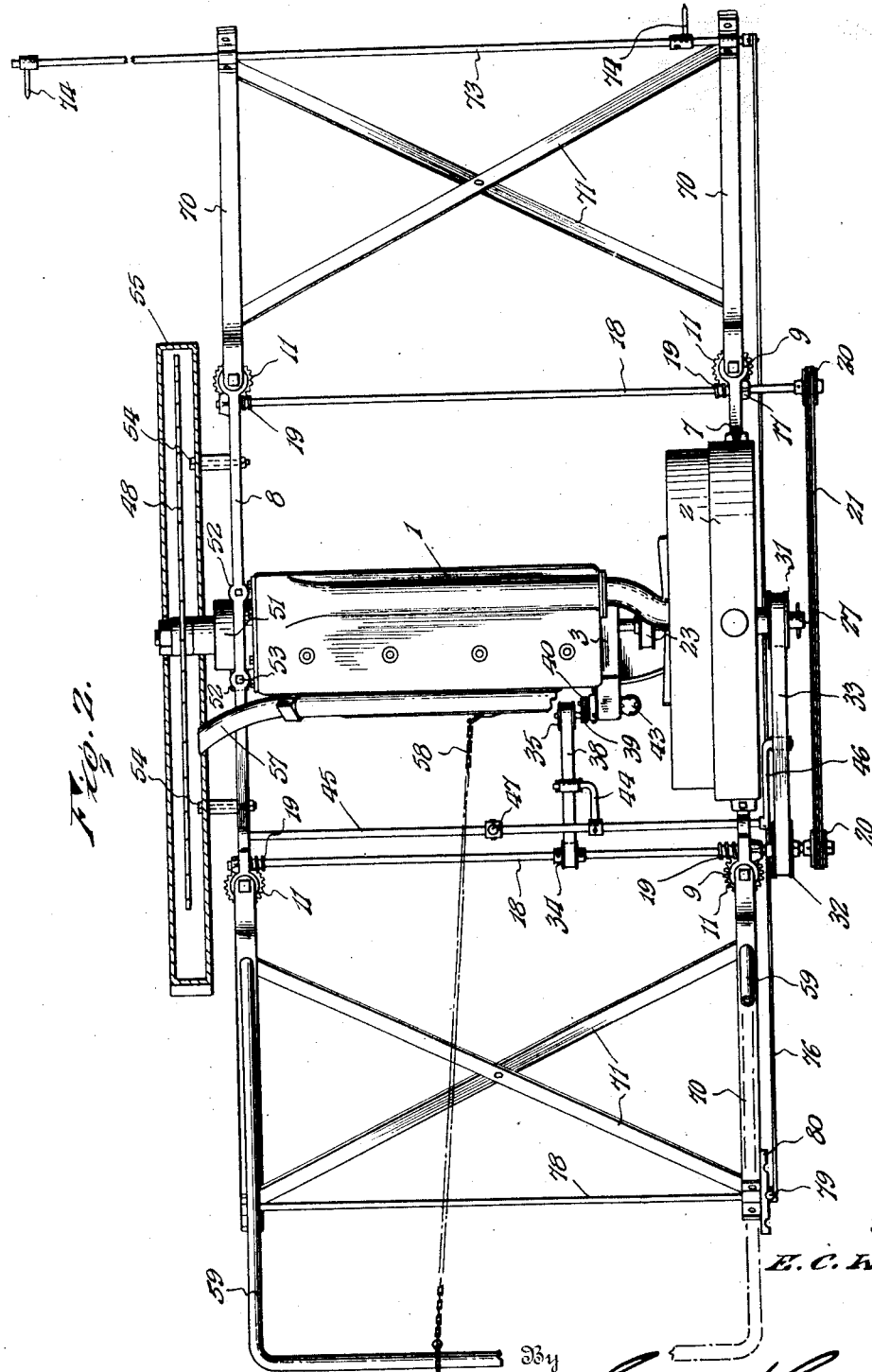
Inventor
E. C. Wells.
By
Attorneys Nov. 5, 1929.  E. C. WELLS  1,734,888
ICE SAWING MACHINE
Filed Nov. 26, 1927  4 Sheets-Sheet 3
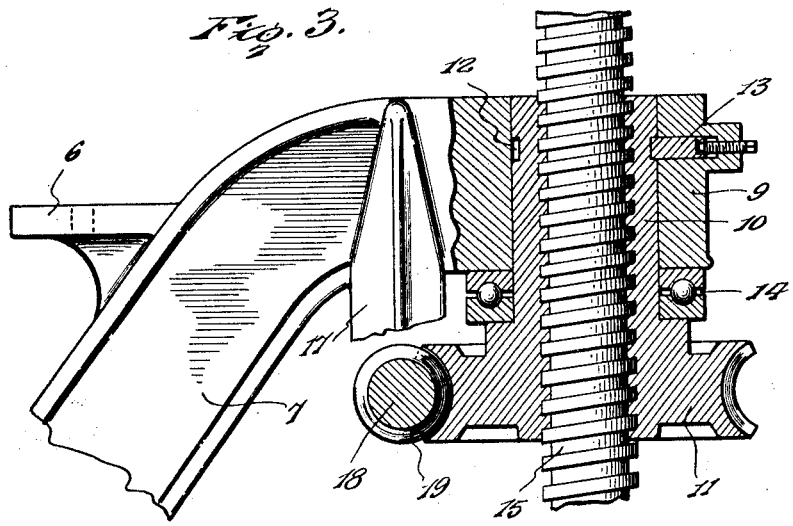
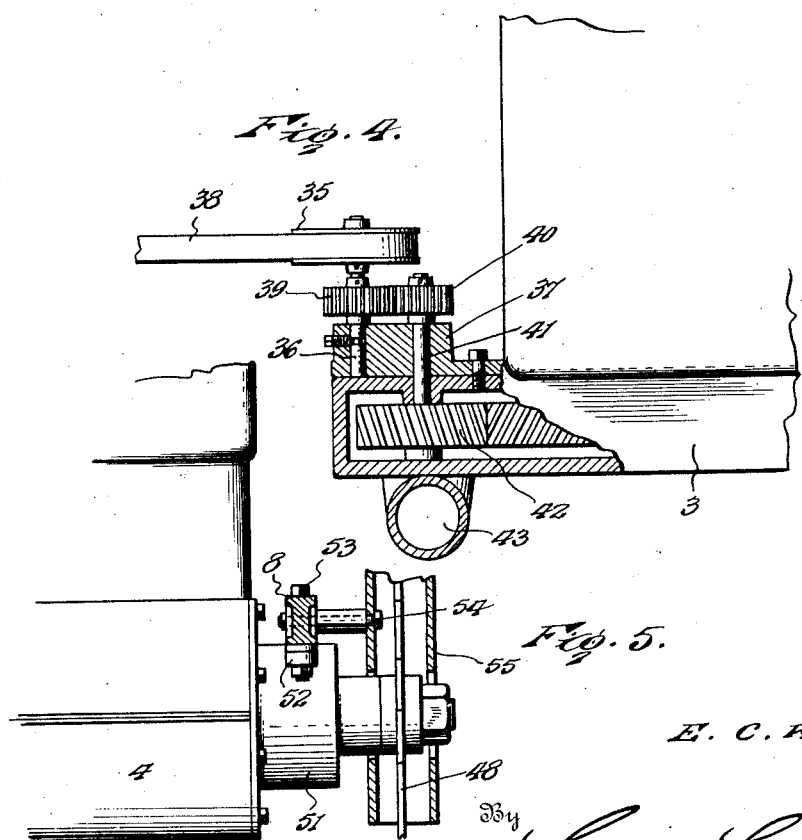
Inventor
E. C. Wells.
By Lacey & Lacey, Attorneys

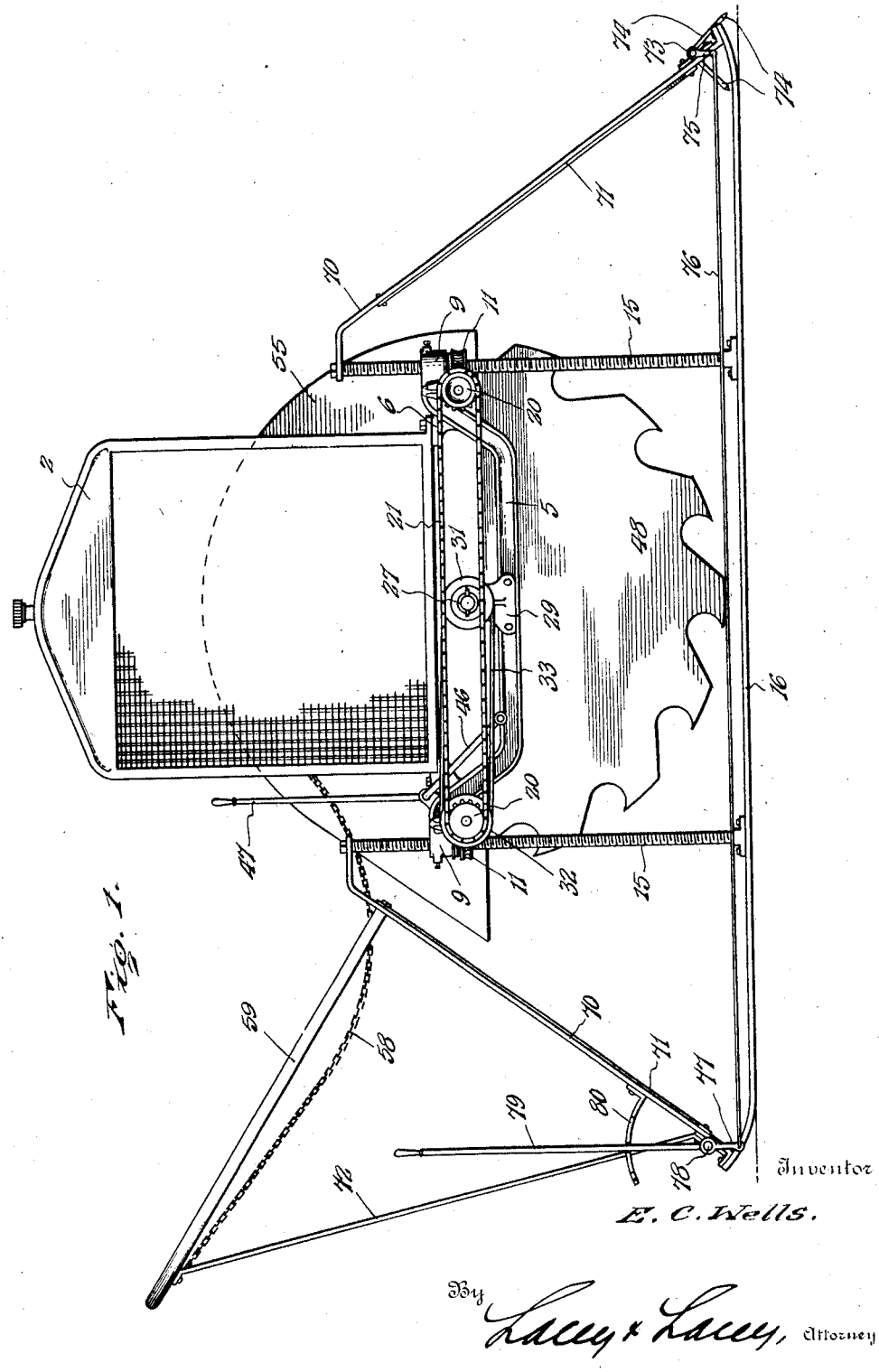

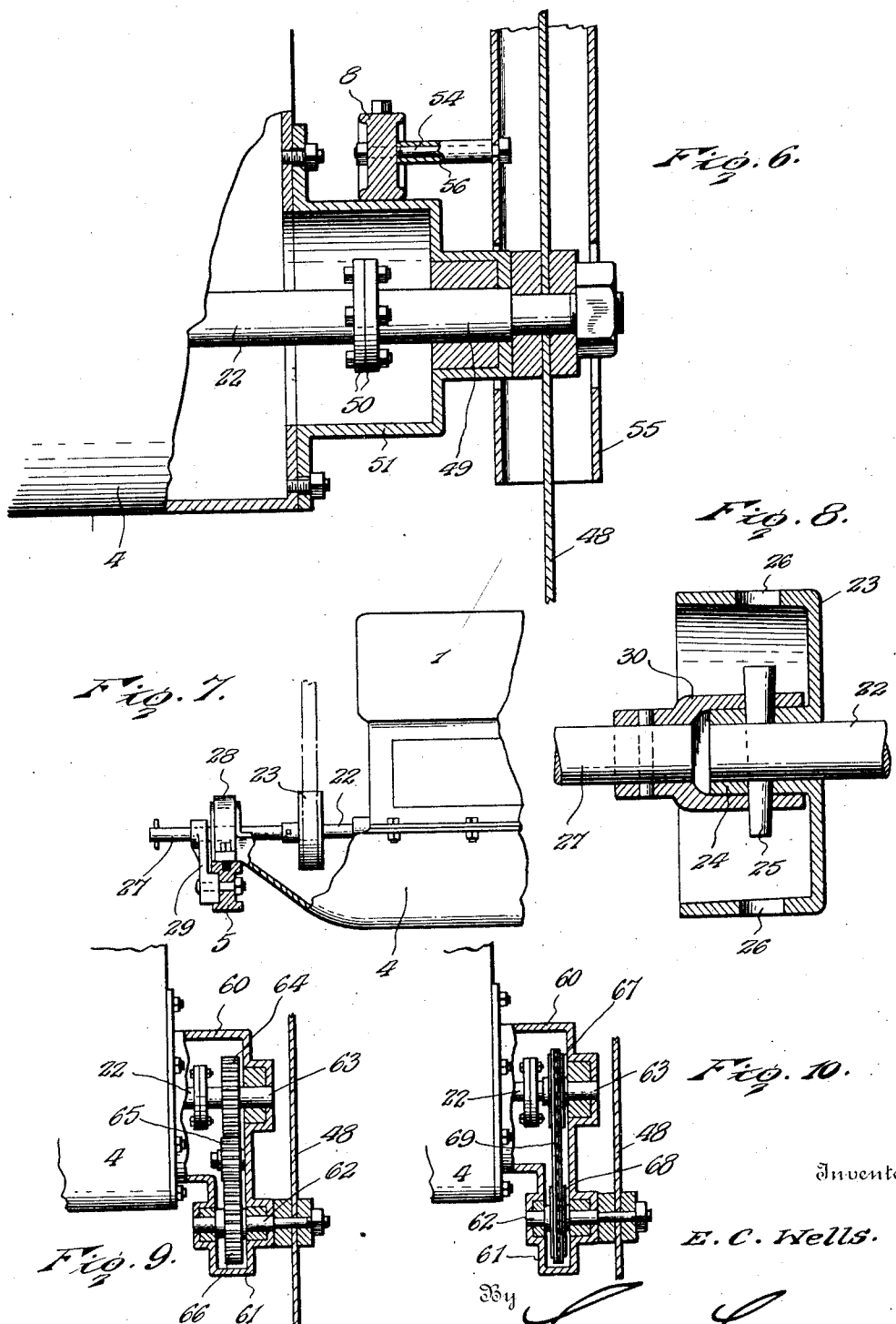

Patented Nov. 5, 1929

1,734,888

UNITED STATES PATENT OFFICE

EMIL C. WELLS, OF NORTH WHITE LAKE, NEW YORK

ICE-SAWING MACHINE

Application filed November 26, 1927. Serial No. 235,836.

This invention relates to apparatus for use in harvesting natural ice and has for its object the provision of a saw mounted in such a manner that it may be easily adjusted to cut at a desired depth or supported above the surface of the ice in order to be moved from point to point without operating. Particular objects of the invention are to mount the saw upon a light portable frame which may be easily pushed over the surface of the ice when the latter is to be cut; to provide simple means whereby the successive cuts made by the saw may be formed on parallel lines; to provide novel means whereby the power employed for rotating the saw may be utilized to vertically adjust the same; to provide means whereby accumulation of ice upon the saw blade will be prevented; and to simplify and improve generally the construction and arrangement of the working parts of an ice-sawing machine. These several objects, and other objects which will incidentally appear in the course of the following description, are attained in such a mechanism as is illustrated in the accompanying drawings, and the invention resides in certain novel features which will be particularly defined in the appended claims.

In the drawings:

Figure 1 is a side elevation of an ice-sawing machine embodying the present invention;

Fig. 2 is a top plan view, partly broken away and partly in horizontal section, of the same;

Fig. 3 is an enlarged detail vertical section of a portion of the mechanism for vertically adjusting the saw;

Fig. 4 is an enlarged detail horizontal section of another portion of the means for vertically adjusting the saw;

Fig. 5 is a detail sectional elevation showing the manner of mounting the saw;

Fig. 6 is an enlarged detail vertical section through the parts shown in Fig. 5, the plane of the section extending along the axis of the saw blade;

Fig. 7 is a detail sectional elevation showing the mounting of the extension shaft;

Fig. 8 is an enlarged detail section of the coupling whereby the extension shaft is connected to the crank of the motor, and Figs. 9 and 10 are horizontal sections showing variations in the means for mounting the saw arbor designed to reduce the speed of the saw arbor relative to the crank shaft of the motor.

In carrying out the present invention, I employ an internal combustion engine which is now in very general use upon automobiles, the engine being shown conventionally at 1 and including a radiator shown conventionally at 2 with the usual ignition and timer systems and fuel tank, the fuel tank being omitted for the sake of clearness in the illustration and the timer and ignition systems being indicated conventionally only at 3. This motor includes a crank case 4, and, in carrying out the present invention, the front end of the crank case is secured upon an I-beam 5 which has its ends in a higher plane than its intermediate portion whereby it is given a shallow U-shape, as shown clearly in Fig. 1, the radiator 2 being secured upon lugs 6 provided upon the end portions 7 of the beam adjacent the upper extremities thereof, as shown most clearly in Fig. 3. The rear end of the crank case is supported by a parallel I-beam 8 in a manner which will be more particularly set forth hereinafter. At the extremities of the front I-beam 5 are formed rings or collars 9 which receive the upstanding stems or hubs 10 of worm gears 11, as shown in detail in Fig. 3, the hubs or stems being constructed with annular grooves 12 receiving pins 13 mounted laterally in the respective ring or collar 9 whereby the hub will be swiveled in the bearing ring or collar. Anti-friction bearings 14 are provided around the base of the hub or stem 10 between the under side of the bearing ring or collar and the upper side of the worm gear 11 so that the wear due to the thrust of the parts will be minimized. The bore of the hub and the worm gear is internally threaded and receives a threaded post or column 15, the lower end of which is rigidly secured to a runner 16. The upturned end of the I-beam is also formed with a bearing bracket or arm 17 which depends from the extremity of the beam and supports a shaft 18 having a worm 19 thereon meshing with the worm gear 11, as shown and as will be understood. It will be understood, especially upon reference to Fig. 2 of the drawings, that the shaft 18 is duplicated at the two sides of the motor and the described gearing is provided at each end of each I-beam 5 and 8 so that there are four threaded posts 15 and two runners 16, but as the construction of all these parts is the same throughout, the description just given for one will suffice for all. At one side of the machine which, for convenience, will be referred to as the front side inasmuch as it is the side carrying the radiator 2, the shafts 18 are equipped with sprocket pinions 20 and a sprocket chain 21 is trained around said pinions so that, when motion is imparted to either shaft, the other shaft will rotate in the same direction and at the same speed.

The shafts 18 are rotated in one direction from the crank shaft of the motor and in the opposite direction by gearing actuated by the timer gears. The motor utilized by me in the practice of my invention has the front end of its crank shaft 22 equipped with a pulley 23 which is ordinarily connected with a fan shaft to drive a fan which forms a part of the cooling system of the power plant. As shown in Fig. 8, this fan pulley has its hub portion 24 provided with radial openings through which a tapered pin or wedge 25 is driven, the pin or wedge also passing through an opening provided therefor in the end of the crank shaft whereby the pulley will be secured to the shaft, it being noted that the peripheral flange of the pulley is provided with openings 26 to facilitate the insertion or withdrawal of the pin in an obvious manner. In carrying out my invention, there is provided an extension shaft 27 which is arranged in axial alinement with the front end of the crank shaft and is journaled in a bearing 28 provided therefor on the front I-beam 5, a bracket 29 being also secured to the beam and rising therefrom in front of the bearing 28 so as to further support the extension shaft and resist bending of the same. To the rear end of the extension shaft is secured a coupling sleeve 30 which is adapted to fit over the hub 24 of the fan pulley, as shown in Fig. 8, and is equipped with radial openings adapted to aline with the openings in the hub and through which the wedge or tapered pin 25 may be driven to connect the extension shaft to the crank shaft so that the extension shaft will rotate with the crank shaft. On the outer or front end of the extension shaft is secured a pulley 31 and upon one of the shafts 18 is secured a similar pulley 32, a belt 33 being trained about said pulleys and ordinarily being loose thereon so that the pulley 32 will not be driven. It will be obvious that, if the belt 33 be tightened so that it will transmit the rotation of the pulley 31 to the pulley 32, the shafts 18 will be rotated in one direction, and I have arranged the parts so that the result of the rotation of the pulley 32 will be an upward travel of the I-beams and the parts carried thereby upon the posts 15. To effect rotation of the shafts 18 in the opposite direction, a pulley 34 is secured upon one of said shafts between the ends thereof and a similar pulley 35 is carried by a stub shaft 36 mounted in a bracket 37 which is secured to the rear side of the timer casing 3, as shown most clearly in Fig. 4. A belt 38 is trained around the pulleys 34 and 35 and a pinion 39 is secured upon the shaft 36 to mesh with a pinion 40 on the rear end of a shaft 41 which is journaled through the block 37 and in the rear side of the timer casing and carries at its inner end a gear 42 which is driven directly by the timer gear. Lubricant is supplied to the timer casing and the gears therein through a cup 43 provided on the casing, as shown. The belt 38 is normally loose, and disposed above the belt is a tightener arm 44 carried by a rock shaft 45 which is mounted in and extends between the I-beams 5 and 8 and is equipped at its front end with a tightener crank arm 46 having its end disposed below the belt 33. A hand lever 47 is secured to the shaft 45 at any convenient point in the length of the same, and it will be understood that the operator by grasping this lever and rocking the shaft in the proper direction may tighten either the belt 33 or the belt 38 and thereby effect the vertical adjustment of the motor and the parts associated therewith. This vertical adjustment of the motor is simultaneous with the vertical adjustment of the saw blade 48 so that the saw may be thus adjusted by the power of the motor to run at a desired depth or be set above the surface of the ice when the machine is to be transported without operating.

The saw is secured upon the saw arbor 49 in the usual or any preferred manner and the saw arbor constitutes an extension of the crank shaft of the motor. In adapting the motor to the purposes of my invention, the transmission casing and the transmission gearing are removed and the saw arbor 49 is bolted directly to the rear end of the crank shaft, the securing bolts being inserted through mating flanges 50 upon the ends of the arbor and the crank shaft, as shown in Fig. 6. To support the outer end of the crank shaft and the saw arbor, a casing 51 is provided and is bolted to the end of the crank casing 4 in the same manner that the transmission casing is usually secured thereto. This casing 51 is disposed below the rear I-beam 8 and is provided on its upper portion with lugs or ears 52 through which and the I-beam the securing bolts 53 are inserted so that the crank case and motor and the casing 51 will be connected with the beam 8 in such a manner that the beam will support the rear end of the motor. At opposite sides of the casing 51 and spaced therefrom bolts 54 are mounted in the beam 8, and these bolts carry on their outer ends a hood 55 which fits around the upper portion of the saw and thereby serves as a guard to prevent contact of passers-by with the saw, spacer sleeves 56 being disposed around the bolts 54 between the beam 8 and the hood so that the hood will be supported in proper relation to the frame and the motor. To prevent ice shavings accumulating upon the saw so as to clog the action of the same, I lead the exhaust flue 57 of the motor through the side of the hood 55, as shown clearly in Fig. 2, so that the heat from the exhaust will play upon the saw in an obvious manner and thereby melt any ice shavings which may tend to adhere thereto. Also the temperature of the saw will be raised so that its progress through the hard ice will be facilitated.

When the saw is coupled directly to the crank shaft, as has been described, the speed of the saw will be regulated by throttling of the engine, the throttle lever having attached thereto a chain 58 which extends to the outer portion of the push bar or handle 59 by which the operator propels the machine over the ice. The provision of the chain or other flexible element 58 permits the operator to readily set the throttle valve as may be desired. It is desirable, however, frequently to provide a speed reduction gear between the crank shaft and the saw arbor, and in Figs. 9 and 10 I have shown two forms of speed reduction gears which may be employed. In both of these arrangements, the gear case 60, which is substituted for the first described gear case 51, is formed with a lateral extension 61 and the saw arbor 62 is journaled in the outer end portion of this lateral extension, a transmission shaft 63 being coupled directly to the crank shaft and journaled in the main portion of the casing, as shown. In Fig. 9, the transmission shaft 63 carries a spur gear 64 which meshes with an intermediate pinion 65 carried by a stub shaft secured upon the wall of the casing 60, and this intermediate pinion 65, in turn, meshes with a spur gear 66 secured on the saw arbor. In the form shown in Fig. 10, a sprocket gear 67 is secured upon the transmission shaft 63 and a sprocket gear 68 is secured upon the saw arbor, a chain 69 being trained about the gears 67 and 68.

The upper end of each threaded post 15 is swiveled in the upper end of a brace 70 which extends downwardly and outwardly to the adjacent end of the corresponding runner 16, and diagonal braces 71 are disposed between and attached to the respective braces 70 at the ends of the machine so that the posts 15 will be maintained in an upright position. At one end of the machine, the push bar 59 previously mentioned is secured to the braces 70 and reinforcing props are extended between the lower ends of said braces and the outer portion of the push bar, as indicated at 72. This push bar is preferably in the form of a bail or U-shaped bar so that it may be easily grasped by the operator who is thereby enabled to push the machine over the ice as the cut is formed therein or when proceeding to the place of operations or returning when the work is finished.

Mounted upon the braces 70 at the advancing end of the machine is a gage shaft 73 which extends across the end of the machine and projects laterally beyond the saw side thereof, as shown in Fig. 2, and upon this shaft adjacent the ends thereof are secured adjustable gages 74 being arranged in pairs with the members of each pair at a right angle to each other, as shown. One of these gages is used when the machine is cutting one way and the other used when the machine is turned around and cutting back. At the opposite side of the machine, the shaft 73 is provided with a crank 75 and a connecting rod 76 is pivoted to said crank and to a corresponding crank 77 which is formed upon a rock shaft 78 mounted on the adjacent braces 70 and equipped with a hand lever 79 whereby the shaft 73 may be rocked as desired. The lever 79 cooperates with a notched plate 80 so that it may be held in a set position. When the saw is in an elevated position and is not performing any work, the lever 79 is set in a neutral position illustrated in Fig. 1 and the gages 74 will, consequently, be both out of contact with the ice. When the machine is in use, the shaft 73 is set so that the gage will be in the previous cut in the ice and then, when the machine is pushed forward, the gage will slide along in the previous cut therefor guiding the saw or machine to cut any desired size cake of ice.

From the foregoing description, taken in connection with the accompanying drawings, it will be seen that I have provided an exceedingly compact, simple and light machine which may be easily pushed over a field of ice and by which the saw will be operated to cut through the same. The saw may be quickly adjusted to run at a desired depth without imposing any strain upon the operator or requiring any manual operation other than shifting the lever 47 so that the power of the motor will be properly applied to effect the proper movement of the adjusting shafts 18.

Having thus described the invention, I claim:

1. In an ice-sawing machine, the combination of a portable support, an internal combustion motor mounted on the support, a rotatable saw driven by the motor, a hood secured on the support and housing the saw, and means for directing exhaust from the motor into said hood.

2. An ice-sawing machine comprising a plurality of threaded posts, beams extending between corresponding posts, gears swiveled in the ends of the beams and having threaded bores engaging the posts, a motor carried by the beams, a saw carried by one of the beams and driven by the motor, and means carried by the beams and operable by the motor to rotate said gears for vertically adjusting the beams upon the posts.

3. An ice-sawing machine comprising a plurality of threaded posts, beams having their ends fitted around corresponding posts, a motor carried by the beams, a saw carried by one of the beams and driven by the motor, worm gears swiveled in the ends of the beams and engaging the threaded posts, shafts mounted on and extending between the beams and provided with worms meshing with the respective gears, means operatively connecting said shafts whereby they will rotate at the same speed and in the same direction, pulleys secured upon one of the shafts, corresponding pulleys mounted to be driven by the motor, belts connecting the pulleys on the shaft with the pulleys driven by the motor and normally loose, a rock shaft, and tightener arms carried by said shaft and arranged one below one of the belts and the other above the other belt whereby either belt may be tightened to rotate the shaft in a given direction.

4. An ice-sawing machine comprising threaded posts, beams having their ends encircling said posts, gearing carried by the beams and the posts whereby the beams may be adjusted vertically upon the posts, a motor carried by the beams and including a crank shaft, a saw carried by one of the beams and driven by the motor, an extension shaft coupled to the crank shaft of the motor and supported by the other beam, an operative connection between said extension shaft and the gearing on the posts and the beams, and other gearing connecting the timer gearing of the motor with the gearing on the posts and the beams.

In testimony whereof I affix my signature.

EMIL C. WELLS. [L. S.]